Jan. 25, 1927.
C. C. FARMER
1,615,370
BRAKE CYLINDER DEVICE
Filed April 5, 1926
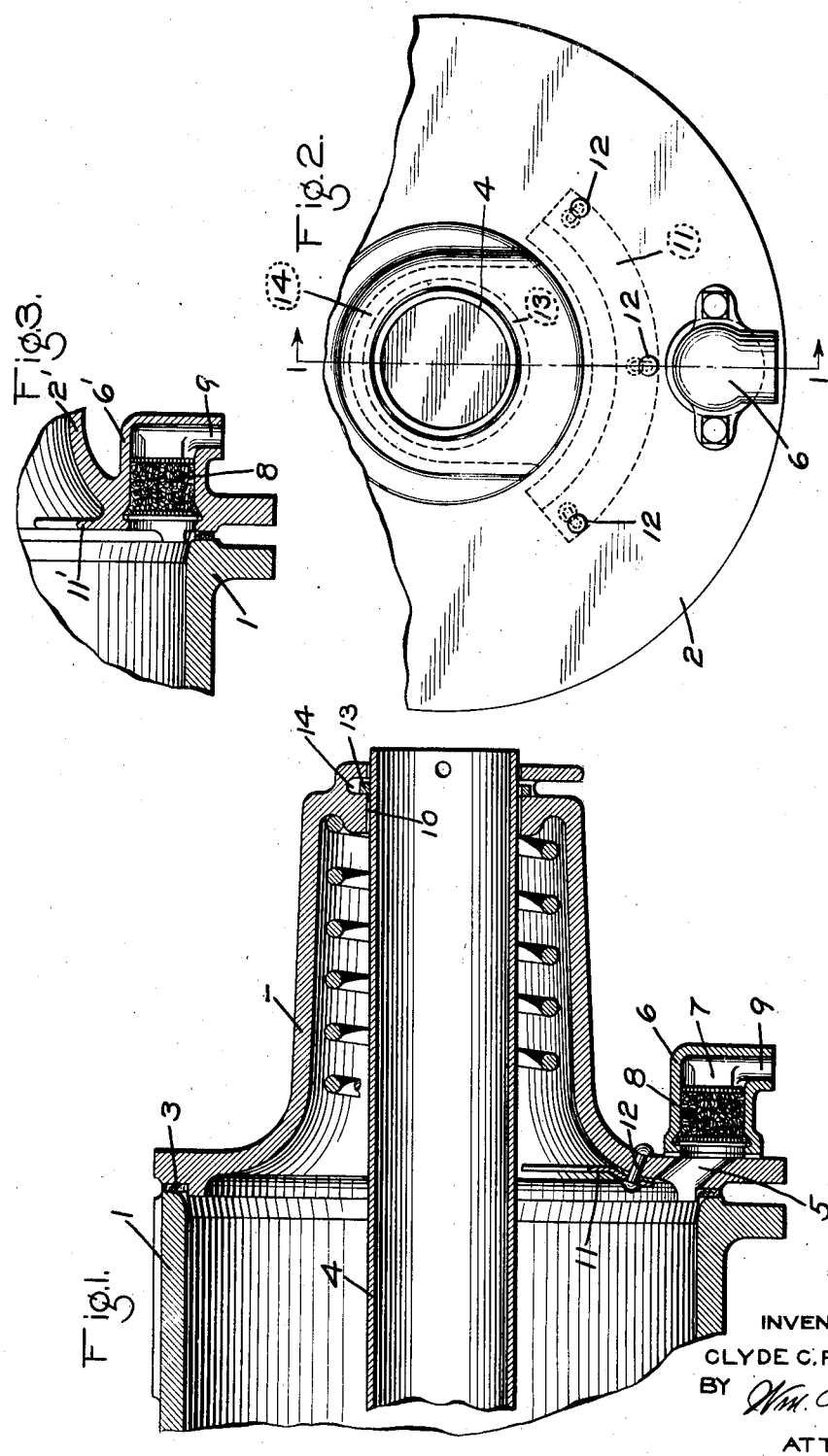
INVENTOR
CLYDE C. FARMER
BY Wm. M. Cady
ATTORNEY Patented Jan. 25, 1927.

1,615,370

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-CYLINDER DEVICE.

Application filed April 5, 1926. Serial No. 99,781.

This invention relates to brake cylinders, such as are employed on railway cars for controlling the brakes by fluid under pressure.

In the use of brake cylinders on cars, trouble has been experienced, due to water and dirt collecting in the chamber at the non-pressure side of the brake cylinder piston. When the brake cylinder piston moves toward release position, atmospheric air flows into the chamber at the non-pressure side of the piston, around the loosely fitting piston rod.

Since the opening around the piston rod is relatively small, air rushes in with a considerable velocity, carrying with it dirt and moisture, particularly foreign matter which may have collected on the piston rod.

Moisture in the brake cylinder causes rusting and in cold weather tends to freeze on the inner bottom wall of the brake cylinder and dirt and sand which may enter the brake cylinder acts as an abrasive and tends to unduly wear the brake cylinder piston packing.

The principal object of my invention is to provide means for preventing the entrance of foreign matter into the chamber at the non-pressure side of the brake cylinder piston and means for preventing the accumulation of moisture on the walls of the brake cylinder.

In the accompanying drawing; Fig. 1 is a section on the line 1—1 of Fig. 2 of a brake cylinder with my improvement applied thereto; Fig. 2 a fragmentary end view of the brake cylinder; and Fig. 3 a fragmentary section, similar to that shown in Fig. 1, showing a slightly modified form of my invention.

As shown in the drawing, the brake cylinder 1 is provided with a non-pressure head 2, which is secured to the brake cylinder in the usual manner with a gasket 3, interposed between the cylinder and the head. The brake cylinder piston rod 4 is connected to the usual piston (not shown) contained in the brake cylinder 1 and extends out through an opening in the non-pressure head 2.

According to my invention, the non-pressure head 2 is provided at its lowermost point, with a downwardly extending opening 5 and secured to the flange portion of the head in registry with said opening is a member 6 having a cylindrical chamber 7 in which is positioned a curled hair air strainer 8. A downwardly extending passage 9 leads from said chamber to the atmosphere.

The piston rod 4 loosely fits the opening 10 in the non-pressure head 2, through which said piston rod extends, and in order to prevent the entrance of flying particles of dirt, snow, or water which may enter through the opening 10, I provide a baffle ring 13 which is loosely supported by the piston rod 4. The outer end portion of the non-pressure head is provided with a recess 14 to receive the ring, and said recess is open at the under side so that the ring may be installed when the piston rod is moved back sufficiently to permit the ring to be placed within the recess. The piston rod 4 is then moved forward, so that the ring rests on the rod, as shown in Fig. 1.

Particles of foreign matter entering the opening 10 from the atmosphere will impinge on the ring 13 and will then fall down along the ring and out to the atmosphere, thus preventing the particles from entering the cylinder.

When the brake cylinder piston moves inwardly in the brake cylinder toward release position, air from the atmosphere readily flows through the strainer 8 in the member 6 to fill the volume created by the movement of the piston. Dirt and moisture is prevented from entering the chamber by the strainer 8, and air having free access to the chamber, by way of the member 6, there is little or no air flow to the chamber around the piston rod 4.

However, any particles of foreign matter which may pass into the opening 10 are prevented, to a large extent, from entering the cylinder, by the operation of the baffle ring 13. Should any dirt succeed in passing the ring into the non-pressure head 2, it is prevented from passing to the brake cylinder walls by means of a deflector, which may consists of a plate 11, in the form of a segment of a ring, and which is secured to and within the non-pressure head 2 by means of nuts 12.

Said deflector is located adjacent to the joint between the cylinder and the head and at the lower part of the head, so that a pocket is formed in the head, which is adapted to receive dirt and moisture which enters the chamber around the piston rod and thus prevent its entrance to the brake cylinder proper.

Instead of making the member 6 and the deflector 11 as separate parts adapted to be secured to the non-pressure head, the parts may be cast integral with said head, as shown in Fig. 3.

Having now described my invention, what I claim as new and desire to secure by Letters Patent, is:—

1. The combination with a brake cylinder having a non-pressure head, of a member associated with said head and having an opening through which air from the atmosphere can flow to the chamber at the non-pressure side of the brake cylinder.

2. The combination with a brake cylinder having a non-pressure head, of a member associated with said head and having an opening through which air from the atmosphere can flow to the chamber at the non-pressure side of the brake cylinder and an air strainer disposed in said opening to prevent the passage of foreign matter.

3. The combination with a brake cylinder having a non-pressure head and a brake cylinder piston rod extending through said head, of a member mounted in said head and forming a pocket to receive foreign matter passing into the chamber at the non-pressure side of the brake cylinder and around the piston rod.

4. The combination with a brake cylinder having a non-pressure head and a brake cylinder piston rod extending through said head, of a ring supported by said rod where the head extends through the non-pressure head, for preventing the entrance of foreign material into the non-pressure head.

5. The combination with a brake cylinder having a non-pressure head and a brake cylinder piston rod extending through an opening in said head, of a ring disposed in a recess in the non-pressure head of said opening and loosely supported by said rod, for deflecting particles of foreign matter which enter the opening from the atmosphere.

6. The combination with a brake cylinder having a non-pressure head and a brake cylinder piston rod extending through an opening in said head, of means disposed at said opening for deflecting particles of foreign matter entering said opening from the atmosphere, a member mounted in said head and forming a pocket for receiving foreign matter entering said head through said opening, and means independent of said opening for permitting the free entrance of air from the atmosphere to the interior of the non-pressure head.

In testimony whereof I have hereunto set my hand.

CLYDE C. FARMER.